(12) United States Patent
Ando et al.

(10) Patent No.: US 12,031,959 B2
(45) Date of Patent: Jul. 9, 2024

(54) AUTO-SAMPLER FOR CHROMATOGRAPHS

(71) Applicant: SHIMADZU CORPORATION, Kyoto (JP)

(72) Inventors: Shotaro Ando, Kyoto (JP); Takashi Inoue, Kyoto (JP); Kenichi Yasunaga, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 492 days.

(21) Appl. No.: 17/295,979

(22) PCT Filed: Dec. 10, 2018

(86) PCT No.: PCT/JP2018/045236
§ 371 (c)(1),
(2) Date: May 21, 2021

(87) PCT Pub. No.: WO2020/121365
PCT Pub. Date: Jun. 18, 2020

(65) Prior Publication Data
US 2022/0026400 A1 Jan. 27, 2022

(51) Int. Cl.
*G01N 30/24* (2006.01)
*G01N 30/32* (2006.01)

(52) U.S. Cl.
CPC .............. *G01N 30/24* (2013.01); *G01N 30/32* (2013.01); *G01N 2030/328* (2013.01)

(58) Field of Classification Search
CPC ... G01N 30/24; G01N 30/32; G01N 2030/328
(Continued)

(56) References Cited

U.S. PATENT DOCUMENTS 3,733,909 A * 5/1973 Golovistikov ......... G01N 30/12
73/864.86
4,422,860 A * 12/1983 Feinstein ............... G01N 30/20
95/87
(Continued)

FOREIGN PATENT DOCUMENTS

CH 551209 A * 7/1974 ............. G01N 30/12
CN 102879505 A * 1/2013 ............. G01N 30/24
(Continued)

OTHER PUBLICATIONS

Shenzhen Mindray Bio-Medical Electronics Co., Ltd., BS-200 Chemistry Analyzer Operation Manual, Mar. 2006, pp. 5-13 and 5-14; ULR: https://docslide.net/download/link/mindray-bs-200-user-manual; 4 pages.
(Continued)

*Primary Examiner* — Peter J Macchiarolo
*Assistant Examiner* — Monica S Young
(74) *Attorney, Agent, or Firm* — Maier & Maier, PLLC

(57) ABSTRACT

The auto-sampler for chromatographs includes a sampling needle, a pipe, a pump portion, and a connecting mechanism configured to connect the sampling needle and the pipe. The connecting mechanism includes a first component fixed to the sampling needle, a second component fixed to the pipe, a fixing component, and a packing. The fixing component fixes the first component and the second component using screwing of screws while the end surface of the sampling needle and the end surface of the pipe are in contact with the packing. As a result, dead volume at the connecting portion between the sampling needle and the pipe is reduced.

10 Claims, 2 Drawing Sheets

(58) Field of Classification Search
USPC .............................................. 73/61.5, 61.55
See application file for complete search history.

(56) References Cited

U.S. PATENT DOCUMENTS

| | | | | |
|---|---|---|---|---|
| 4,619,473 | A * | 10/1986 | Someya | B01D 15/08 |
| | | | | 285/148.13 |
| 4,624,148 | A * | 11/1986 | Averette | G01N 35/1079 |
| | | | | 73/864.21 |
| 5,005,434 | A | 4/1991 | Watanabe et al. | |
| 10,690,637 | B2 | 6/2020 | Yasunaga | |
| 2006/0163143 | A1 * | 7/2006 | Chirica | B01L 3/502715 |
| | | | | 73/863.23 |
| 2011/0247405 | A1 * | 10/2011 | Yasunaga | G01N 35/1097 |
| | | | | 73/61.55 |
| 2013/0233054 | A1 * | 9/2013 | Oliphant | G01N 30/16 |
| | | | | 73/23.37 |
| 2018/0100837 | A1 | 4/2018 | Nielsen et al. | |

FOREIGN PATENT DOCUMENTS

| | | | | | |
|---|---|---|---|---|---|
| CN | 106770848 | A * | 5/2017 | ............ | G01N 30/24 |
| CN | 107917981 | A | 4/2018 | | |
| IT | 1066792 | B * | 3/1985 | ............ | G01N 30/22 |
| JP | S59-193351 | A | 11/1984 | | |
| JP | H02-061557 | A | 3/1990 | | |
| JP | 2001-091522 | A | 4/2001 | | |
| JP | 2016-014468 | A | 1/2016 | | |
| JP | 2017-067176 | A | 4/2017 | | |
| WO | WO-2011145162 | A1 * | 11/2011 | ............ | G01N 30/18 |
| WO | 2017/006410 | A1 | 1/2017 | | |
| WO | WO-2020121430 | A1 * | 6/2020 | ............ | G01N 30/24 |

OTHER PUBLICATIONS

International Search Report issued on Feb. 19, 2019 in corresponding International application No. PCT/JP2018/045236; 6 pages.
Written Opinion of the International Searching Authority issued on Feb. 19, 2019 in corresponding International application No. PCT/JP2018/045236; 10 pages including Machine-generated English-language translation.
Office Action issued on Jul. 18, 2023, in corresponding Chinese Application No. 201880099686.0, 21 pages.
Office Action issued on Nov. 24, 2021 in connection with corresponding Japanese Application No. 2020-558803 (12 pp., including machine-generated English translation).
Office Action issued on Feb. 22, 2024 in corresponding Chinese Application No. 201880099686.0, 22 pages.

\* cited by examiner

AUTO-SAMPLER FOR CHROMATOGRAPHS

TECHNICAL FIELD

The present invention is related to an auto-sampler used for chromatographs such as a liquid chromatograph and a supercritical fluid chromatograph.

BACKGROUND

According to the liquid chromatograph or the supercritical fluid chromatograph, auto-samplers are often used that automatically inject sample into an analysis channel in which mobile phase flows. The auto-sampler includes a switching vale for switching between the channel configurations, a needle for sampling, and a syringe pump for sucking liquid through the needle (Refer to Patent Citation 1.).

The needle of the auto-sampler is configured to move in the vertical direction and directions within a horizontal plane while its tip end faces vertically downward. The needle has a base end with which a pipe is in fluid connection that temporarily hold the liquid sucked from a tip end of the needle. Since the pressure in the channel of the liquid chromatograph reaches tens MPa to hundreds MPa, it is required to provide a sealing at a connecting portion between the base end of the needle and the pipe that can withstand a high pressure. Accordingly, in the past, it has been common to connect the end portion of the needle to a joint member that connects the base end of the needle with the pipe through a male nut and a ferrule.
PATENT CITATION 1: WO2017/006410A1

SUMMARY

In the connecting method using the male nut and the ferrule described above, the needle is fixed to the joint member while the end surface of the metallic needle is pressed against the sealing surfaces in the metallic joint member. Therefore, a gap might be defined between the sealing surface in the joint member and the end surface of the needle due to small roughness of the metallic surface. In addition, in the connecting method using the male nut and the ferrule, depending on skill levels of the workers, the needle might be fixed to the joint member while the needle end surface might not reach the sealing surface in the joint member, thereby defining a gap as dead volume at the connection portion between the needle and the pipe.

If the dead volume at the connecting portion between the needle and the pipe is large, diffusion of the sample component or peak-over of the sample might occur, thereby adversely affecting the result of analysis.

It is an object of the present invention to decrease dead volume at the connecting portion between the needle and the pipe.

The present invention is related to an auto-sampler for chromatographs that injects sample into an analysis channel for chromatography. The auto-sampler according to the present invention includes a sampling needle including a tip end and a base end, the sampling needle being configured to suck the sample through the tip end; a pipe in fluid connection with the base end of the sampling needle; a pump portion provided so as to be in fluid connection with the sampling needle through the pipe, the pump portion being configured to suck the sample through the tip end of the sampling needle; and a connecting mechanism configured to fluidically connect the sampling needle and the pipe. The connecting mechanism includes a first component fixed to one of the sampling needle and the pipe, a second component fixed to the other of the sampling needle and the pipe, and a fixing component configsured to fix the first component and the second component using screwing of screws. The first component includes a first seal surface on which an end surface of said one of the sampling needle and the pipe appears, and the second component includes a second seal surface facing the first seal surface, and an end surface of said other of the sampling needle and the pipe appears on the second seal surface. The connecting mechanism includes a packing interposed between the first seal surface of the first component and the second seal surface of the second component, and the fixing component fixes the first component and the second component while the end surface of the sampling needle and the end surface of the pipe are in contact with the packing.

The meaning of "the end surfaces" of the sampling needle and the pipe "appear" on the first seal surface and the second seal surface respectively is that either the end surfaces are disposed within the same plane of the seal surfaces or the end surfaces protrude from the seal surfaces.

The auto-sampler for chromatographs according to the present invention includes the connecting mechanism that connects the sampling needle and the pipe. The connecting mechanism includes the first component and the second component that are fixed to the sampling needle and the pipe respectively, and a fixing component that fixes the first component and the second component. The first component and the second component has sealing surfaces facing each other, and the end surface of the sampling needle and the end surface of the pipe appear on the sealing surfaces respectively. The packing is interposed between the sealing surfaces of the first component and the second component. The fixing component fixes the first component and the second component while the end surface of the sampling needle and the end surface of the pipe are in contact with the packing. Accordingly, at the connecting portion between the sampling needle and the pipe, the end surface of the sampling needle and the end surface of the pipe are surely in contact with the packing. As a result, dead volume at the connecting portion between the needle and the pipe is reduced.

DETAILED DESCRIPTION

Figure 1:
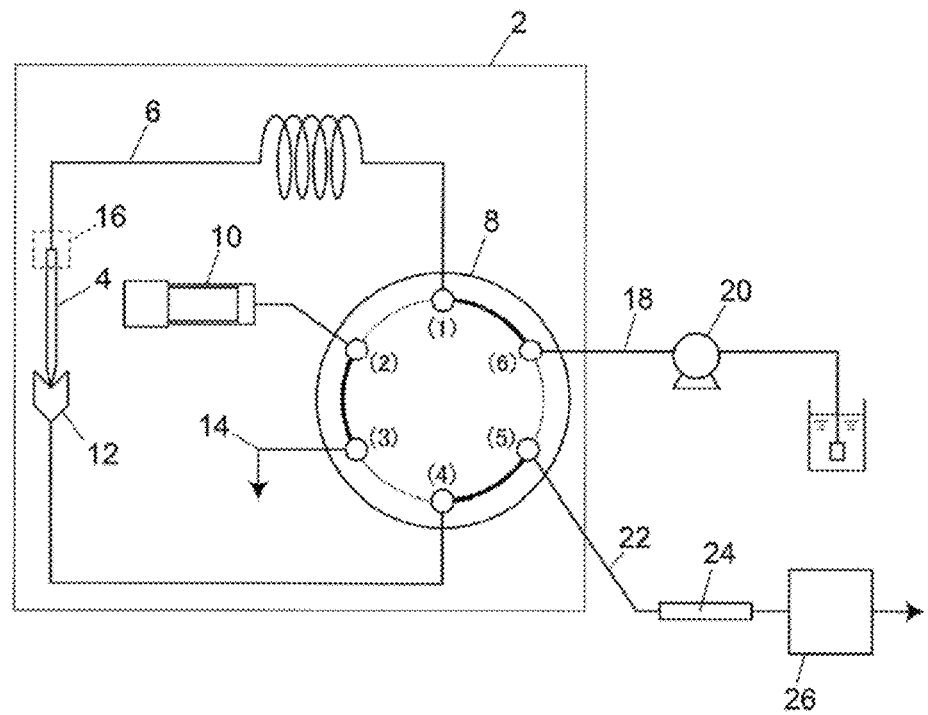
FIG. 1 is a configuration diagram schematically showing one embodiment of an auto-sampler for chromatographs.

Below, referring to the figures, one embodiment of an auto-sampler for chromatographs will be explained. An auto-sampler for a liquid chromatograph will be explained as an example, but the present invention can be applied to an auto-sampler used for a supercritical fluid chromatography as well.

An auto-sampler 2 mainly includes a sampling needle 4, a sample loop 6, a switching valve 8, and a syringe pump 10 (pump portion), and an injecting port 12.

The sampling needle 4 has a tip end and a base end, and the tip end faces vertically downward to suck sample. To the base end of the sampling needle 4, one end of the sample loop 6 is fluidically connected through a connecting mechanism 16. The sample loop 6 is a channel for keeping the sample sucked through the tip end of the sampling needle 4, and has another end opposite to the sampling needle 4, which is in fluid connection to one port (1) of the switching valve 8. The sampling needle 4 is moved in the vertical direction and directions within a horizontal plane by a motion mechanism (not shown).

The switching valve 8 switches between channel configurations, and is a six port valve in this embodiment. To each port of the switching valve 8, the syringe pump 10, the injecting port 12, a drain passage 14, a mobile phase supply passage 18, and an analysis channel 22 are connected, other than the sample loop 6. The mobile phase supply passage 18 is a channel for supplying mobile phase through a liquid delivery pump 20. The analysis channel 22 is a channel in which a separation column 24 and a detector 26 are provided. The switching valve 8 switches between a condition in which the mobile phase supply passage 18 and the analysis channel 22 are directly connected (the port (5) and the port (6) are communicated) and a condition in which the sample loop 6 and the sampling needle 4 are intervened between the mobile phase supply passage 18 and the analysis channel 22 (the port (1) and the port (6) are communicated, the port (2) and the port (3) are communicated, and the port (4) and the port (5) are communicated, as shown in FIG. 1).

The syringe pump 10 is provided to be in fluid communication with the sampling needle 4 by the switching valve 8 through the sample loop 6, and sucks the sample through the sampling needle 4.

The injecting port 12 is in fluid communication with one port of the switching valve 8, and leads the sample that has been sucked through the tip end of the sampling needle 4 and retained in the sample loop 6, to the analysis channel 22.

The connecting mechanism 16 fluidically connects the sampling needle 4 and the sample loop 6, and is configured to minimize dead volume at a connecting portion between the sampling needle 4 and the sample loop 6.

Figure 2:
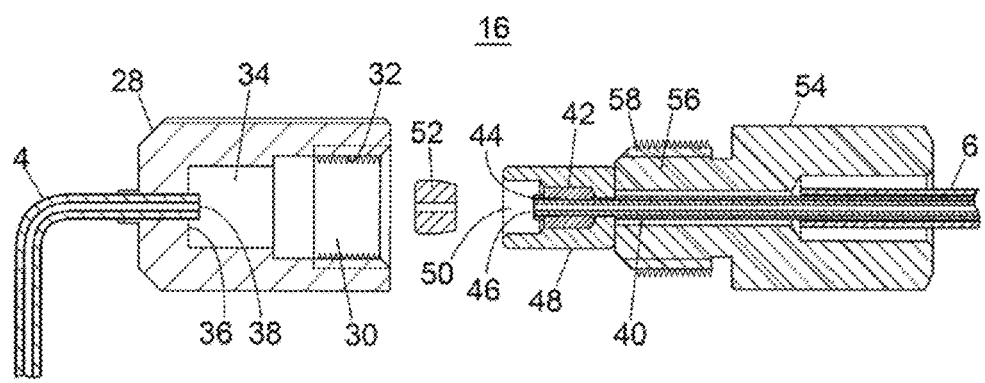
FIG. 2 is a sectional view showing a connecting mechanism connecting the sampling needle and the pipe in the embodiment.

Referring to FIG. 2, the structure of the connecting mechanism 16 used in this embodiment will be explained.

The connecting mechanism 16 includes a needle holder 28 (first component), a sleeve 42 (second component), a sleeve housing 48 (packing holding portion), a packing 52, and a fixing component 54.

The needle holder 28 is fixed to a base end portion of the sampling needle 4. The needle holder 28 is made of metal, and is fixed to the sampling needle 4 by welding, for example. The needle holder 28 includes cylindrical recesses 30, 34 that open in a direction in which a base end surface 38 of the sampling needle 4 faces. In an inner circumferential surface of the recess 30, a female screw 32 (second screw) is formed, and in the center of a bottom surface of the recess 30, the small recess 34 is provided that has an inner diameter smaller than that of the recess 30. The recess 34 has a bottom surface 36 that constitutes a first seal surface on which the end surface 38 of the sampling needle 4 appears. Hereinafter, the bottom surface 36 of the recess 34 will be referred to as "the first seal surface 36".

The meaning of the end surface 38 of the sampling needle 4 "appears" on the first seal surface 36 is that either the end surface 38 is disposed within the same plane of the first seal surface 36 or the end surface 38 protrudes from the first seal surface 36. In this embodiment, the end surface 38 of the sampling needle 4 protrudes from the first seal surface 36 slightly (for example, about 0.3 mm), but it is not necessary to protrude.

The sleeve 42 is a cylindrical member fixed to an end portion of a metallic pipe 40, which defines a section of the sample loop 6 close to the sampling needle 4. The sleeve 42 is made of metal, and is fixed to the pipe 40 by welding, for example. The sleeve 42 includes a second seal surface 44, which faces the first seal surface 36 of the recess 34 of the needle holder 28. An end surface 46 of the pipe 40 close to the sampling needle 4 appears on the second seal surface 44.

The meaning of the end surface 46 "appears" on the second seal surface 44 is that either the end surface 46 is disposed within the same plane of the second seal surface 44 or the end surface 46 protrudes from the second seal surface 44. In this embodiment, the end surface 46 of the pipe 40 is disposed within the same plane of the second seal surface 44, but the end surface 46 may protrude from second seal surface 44 slightly (for example, about 0.3 mm).

The sleeve housing 48 is a metallic cylindrical component provided to accommodate the sleeve 42 at the end portion of the pipe 40. A recess 50 is formed on a surface of the sleeve housing 48 close to the sampling needle 4 for receiving and holding a packing 52, and the sleeve 40 is accommodated in a concave formed in the bottom of the recess 50. In other words, the second seal surface 44 is positioned on the bottom of the recess 50. The sleeve housing 48 has an outer diameter of allowing the recess 34 of the needle holder 28 to fit thereinto. In other words, when the sleeve housing 48 is fitted into the recess 34 of the needle holder 28, the center of the base end surface of the sampling needle 4 corresponds to the center the end surface of the pipe 40.

The packing 52 is made of resin material having elasticity, and has an outer diameter such that it is fitted in the recess 50 of the sleeve housing 48. The material of the packing 52 may be anything so long as it is tolerant to chemical agents such as organic solvents used for chromatography and has elasticity.

The fixing component 54 is a cylindrical metallic component that is provided rotatably around the pipe 40 as the central axis of rotation, near the sleeve housing 48 to the opposite side of the sampling needle 4. The fixing component 54 includes a screw portion 56 having an outer circumferential surface on which a male screw 58 (first screw) is formed, and the end surface of the screw portion 56 is in contact with the end surface of the sleeve housing 48 one the opposite side of the sampling needle 4. The male screw 58, which is provided on the circumference surface of screw portion 56, will be screwed with the female screw 32, which is provided on the inner circumferential surface of the recess 30 of the needle holder 28.

Figure 3:
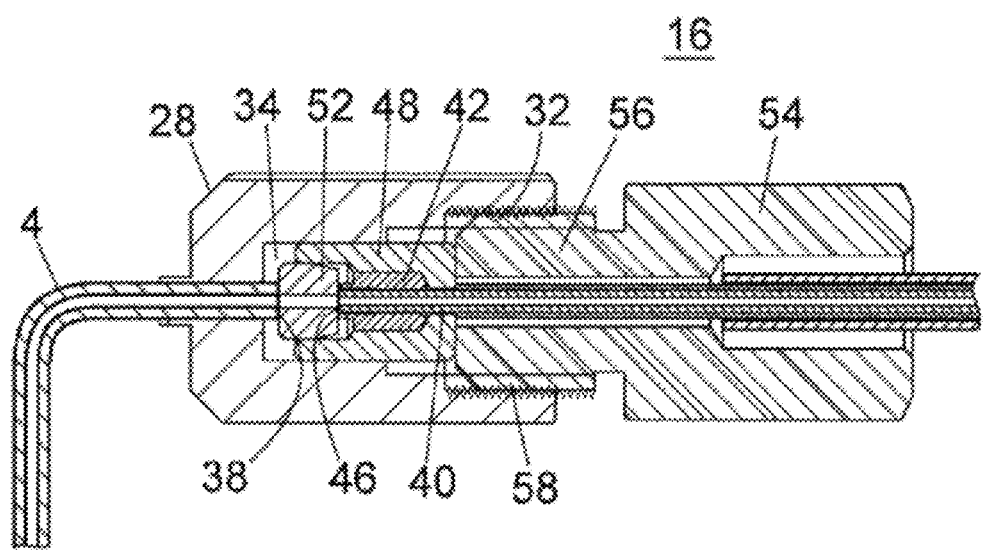
FIG. 3 is a sectional view showing conditions in which the sampling needle and the pipe are connected by the connecting mechanism.

When the sampling needle 4 and the pipe 40 are to be in fluid connection with each other through the connecting mechanism 16, the sleeve housing 48, whose recess 50 holds the packing 52, is inserted into an opening of the recess 30 of the needle holder 28, and the fixing component 54 is rotated to fasten the male screw 58 into the female screw 32 such that first seal surface 36 of needle holder 28 and the second seal surface 44 of sleeve 44 approach each other. Accordingly, as shown in FIG. 3, the packing 52 exists between the end surface 38 of the sampling needle 4 and the end surface 46 of the pipe 40, and the end surfaces 38, 46 are in contact with the packing 52.

When the fixing component 54 is rotated to fasten the screw portion 56 while the packing 52 is interposed between the end surface 38 and the end surface 46, the fixing component 54 approaches the sampling needle 4, so that the sleeve housing 48 holding the sleeve 42 is pressed toward the end surface 38. Since the end portion of the sleeve 42 is fixed to the pipe 40, when the sleeve 42 approaches the end surface 38, a distance between the end surface 38 and the end surface 46 becomes smaller, so that the packing 52 is elastically deformed and a gap between the end surface 38 and the packing 52 and a gap between the end surface 46 and the packing 52 vanish.

In this embodiment, the sampling needle 4 is bent such that the tip end faces vertically downward and the base end faces in a horizontal direction. Accordingly, the pipe 40 can be connected to the base end of the sampling needle 4 in the horizontal direction. If the sampling needle 4 is straight, the base end of sampling needle 4 faces vertically upward, so that the pipe 40 is connected to the sampling needle 4 such that the pipe 40 extends further upward from base end of sampling needle 4. In this case, it is necessary to ensure an extra space above the sampling needle 4, thereby increasing height dimension of the auto-sampler 2. In contrast, since the sampling needle 4 is bent such that base end faces in a direction intersecting the vertical direction, it is not necessary to keep an extra space above the sampling needle 4, thereby reducing height dimension of the auto-sampler 2.

In the previously described embodiment, the needle holder 28 is provided with the recess 30 having the female screw 32, and the screw portion 56 of the fixing component 54 rotatably provided close to the pipe 40 is fitted into the recess 30 and tightened to fix the needle holder 28 (first component) fixed to the sampling needle 4 and the sleeve 42 (second component) fixed to the pipe 40 with each other. However, the present invention is not limited to the above-described embodiment. A mechanism provided close to the sampling needle 4 and a mechanism provided close to the pipe 40 can be exchanged to obtain the same effects.

The auto-sampler 2, which is explained referring to FIG. 1, includes the structure of "total-volume injection manner", wherein after the sample is sucked through the tip end of sampling needle 4, the sampling needle 4 and the sample loop 6 are positioned between the mobile phase supply passage 18 and the analysis channel 22, and the total amount of the sucked sample is injected into the analysis channel 22. However, the present invention is not limited to the previously described manner. The auto-sampler including the structure of "loop injecting method" (For example, refer to FIG. 7 of Patent Citation 1), wherein a certain amount of the sample sucked by the sampling needle is injected into a different sample loop through the injecting port, and the sample loop is connected to the analysis channel, can employ the connecting mechanism explained in the above-described embodiment as a mechanism that fluidically connects the base end of the sampling needle and the pipe.

One embodiment of the auto-sampler (2) according to the present invention includes a sampling needle (4) including a tip end and a base end, the sampling needle (4) being configured to suck the sample through the tip end; a pipe (40) in fluid connection with the base end of the sampling needle (4); a pump portion (10) provided so as to be in fluid connection with the sampling needle (4) through the pipe (40), the pump portion (10) being configured to suck the sample through the tip end of the sampling needle (4); and a connecting mechanism configured to fluidically connect the sampling needle (4) and the pipe (40). The connecting mechanism includes a first component (28) fixed to one of the sampling needle (4) and the pipe (40), a second component (42) fixed to the other of the sampling needle (4) and the pipe (40), and a fixing component (54) configured to fix the first component (28) and the second component (42) using screwing of screws (32, 58). The first component (28) includes a first seal surface (36) on which an end surface (38) of said one of the sampling needle (4) and the pipe (40) appears, and the second component (42) includes a second seal surface (44) facing the first seal surface (36), and an end surface (46) of said other of the sampling needle (4) and the pipe (40) appears on the second seal surface (44). The connecting mechanism (16) includes a packing (52) interposed between the first seal surface (36) of the first component (28) and the second seal surface (44) of the second component (42), and the fixing component (54) fixes the first component (28) and the second component (42) while the end surface (38) of the sampling needle (4) and the end surface (46) of the pipe (40) are in contact with the packing (52).

According to an aspect [1] of the previously described embodiment, the second screw (32) is provided in the first component (28) that is screwed with the first screw (58) provided in the fixing component (54). The fixing component (54) is rotatably provided on a side of the second component (42), and presses the second component (42) toward the first component (28) when the fixing component (54) is fastened to the first component (28). According to the aspect [1], by simply screwing the first screw (58) of the fixing component (54) and the second screw (32) of the first component (28) with each other and rotating the fixing component (54), the end surface (38) of the sampling needle (4) and the end surface (46) of the pipe (40) are pressed against the packing (52), thereby making it easy to connect the sampling needle (4) and the pipe (40).

As a phase [1] of the aspect [1], the first component (28) may include the recess (34) in which the second component (42) is fitted, and the first seal surface (36) may be provided on the bottom surface of the recess (34).

As a phase [2] of the aspect [1], the first component may be fixed to the base end of the sampling needle, and the second component may be fixed to the first end of the pipe. The aspect [2] can be freely combined with the aspect [1].

As an example [1] of the phase [1], the connecting mechanism (16) includes the packing holding portion (48). The packing holding portion (48) holds the packing (52) while the packing holding portion (48) accommodates the second component (42) therein and the packing (52) is in contact with the second seal surface (46). The packing holding portion (48) is fitted in the recess (34) of the first component (28). Accordingly, by fitting the packing holding portion (48) holding the packing (52) into the recess (34) of the first component (28) and fastening fixing member (54) into the first component (28), it is easy to locate the packing (52) between the first seal surface (36) and the second seal surface (44) and to position the second component (42) relative to the first component (28).

As an example [2] of the phase [1], the first screw may be provided on the outer circumferential surface of the fixing component, and second screw may be provided on the inner circumferential surface of the first component. The example [2] can be combined with the example [1].

According to an aspect [2] of the previously described embodiment, the sampling needle (4) is bent such that the tip end faces vertically downward and the base end (38) faces a direction intersecting the vertical direction. According to the aspect [2], compared to a case in which the sampling needle (4) is straight and the pipe (40) is connected to the base end (38) of the sampling needle (4) so as to extend further upward, it becomes unnecessary to keep an extra space above the sampling needle (4), thereby reducing height dimension of the auto-sampler (2).

According to an aspect [3] of the previously described embodiment, the pipe (40) is made of metal, the first component (28) is welded to said one of the sampling needle (4) and the pipe (40), and the second component (42) is welded to said other of the sampling needle (4) and the pipe (40). According to the aspect [3], since the first component (28) and the second component (42) are firmly fixed to the sampling needle (4) and the pipe (40) respectively, the pressure resistance is improved.

According to an aspect [4] of the previously described embodiment, the packing (52) is made of resin.

According to the aspect [4], since the packing (52), which is interposed between the end surface (38) of the sampling needle (4) and the end surface (46) of the pipe 40, has elasticity, a sealing capacity is improved between the sampling needle (4) and the packing (52) as well as between the pipe (40) and the packing (52).

The aspects [1]-[4] can be combined with each other.

REFERENCE SIGNS LIST 2 auto-sampler
4 sampling needle
6 sample loop
8 switching valve
10 syringe pump (pump portion)
12 injecting port
14 drain passage
16 connecting mechanism
18 mobile phase supply passage
20 liquid delivery pump
22 analysis channel
24 separation column
26 detector
28 needle holder (first component)
30, 34, 50 recess
32 female screw (second screw)
36 first seal surface
38 sampling needle end surface
40 pipe
42 sleeve (second component)
44 second seal surface
46 pipe end surface
48 sleeve housing (packing holding portion)
52 packing
54 fixing component
56 screw portion
58 male screw (first screw)

The invention claimed is:

1. A chromatograph comprising:
a sampling needle having a tip end and a base end, the sampling needle being configured to suck sample through the tip end;
a pipe in fluid connection with the base end of the sampling needle; and
a connecting mechanism configured to fluidically connect the sampling needle and the pipe, the connecting mechanism including a first component fixed to the sampling needle and comprising a first recess having an inner circumferential surface and a second recess formed at a bottom surface of the first recess, a second component fixed to the pipe and housed in a packing holding portion, the packing holding portion being configured to fit into the second recess of the first component, the packing holding portion comprising a recess adjacent to the second component for receiving and holding a packing, and a fixing component rotatably provided on a side of the packing holding portion and around the pipe and comprising an outer circumferential surface, wherein the second component is provided with a first screw on the outer circumferential surface, the first component is provided with a second screw on the inner circumferential surface, and the fixing component is configured to fix the first component and the second component by fitting the first screw into the second screw, rotating and pressing the second component toward the first component and into the second recess, and positioning the packing between the pipe and sampling needle,
the first component includes a first seal surface located at a bottom of the second recess on which an end surface of the sampling needle protrudes from or is disposed on the same plane of the first seal surface,
the second component includes a second seal surface facing the first seal surface, an end surface of the pipe protrudes from or is disposed within the same plane of the second seal surface,
the packing is interposed between the first seal surface of the first component and the second seal surface of the second component, and
the connecting mechanism fixes the first component and the second component by using the fixing component so that the end surface of the sampling needle and the end surface of the pipe are in contact with the packing, the packing being elastically deformable such that a gap between the end surface of the sampling needle and the packing and a gap between the packing and the end surface of the pipe vanish by fixing the first component and the second component.

2. The chromatograph according to claim 1, wherein the first component is fixed to the base end of the sampling needle, and
the second component is fixed to the first end of the pipe.

3. The chromatograph according to claim 1, the sampling needle is bent such that the tip end faces vertically downward and the base end faces a direction intersecting the vertical direction.

4. The chromatograph according to claim 1, wherein the pipe is made of metal, the first component is welded to said one of the sampling needle and the pipe, the second component is welded to said other of the sampling needle and the pipe.

5. The chromatograph according to claim 1, wherein the packing is made of resin.

6. An auto-sampler for chromatographs configured to inject sample into an analysis channel for chromatography, comprising:
a sampling needle including a tip end and a base end, the sampling needle being configured to suck the sample through the tip end;
a pipe in fluid connection with the base end of the sampling needle; and
a connecting mechanism configured to fluidically connect the sampling needle and the pipe, the connecting mechanism including a first component fixed to the sampling needle and comprising a first recess having an inner circumferential surface and a second recess formed at a bottom surface of the first recess, a second component fixed to the pipe and housed in a packing holding portion, the packing holding portion being configured to fit into the second recess of the first component, the packing holding portion comprising a recess adjacent to the second component for receiving and holding a packing, and a fixing component rotatably provided on a side of the packing holding portion and around the pipe and comprising an outer circumferential surface, wherein the second component is provided with a first screw on the outer circumferential surface, the first component is provided with a second screw on the inner circumferential surface, and the fixing component is configured to fix the first component and the second component by fitting the first screw into the second screw, rotating and pressing the second component toward the first component and into the second recess, and positioning the packing between the pipe and sampling needle, the first component includes a first seal surface located at a bottom of the second recess on which an end surface of the sampling needle protrudes from or is disposed on the same plane of the first seal surface, the second component includes a second seal surface facing the first seal surface, an end surface of the pipe protrudes from or is disposed within the same plane of the second seal surface, the packing is interposed between the first seal surface of the first component and the second seal surface of the second component, and the connecting mechanism fixes the first component and the second component by using the fixing component so that the end surface of the sampling needle and the end surface of the pipe are in contact with the packing, the packing being elastically deformable such that a gap between the end surface of the sampling needle and the packing and a gap between the packing and the end surface of the pipe vanish by fixing the first component and the second component.

7. The auto-sampler for chromatographs according to claim 6, wherein the first component is fixed to the base end of the sampling needle, and the second component is fixed to the first end of the pipe.

8. The auto-sampler for chromatographs according to claim 6, the sampling needle is bent such that the tip end faces vertically downward and the base end faces a direction intersecting the vertical direction.

9. The auto-sampler for chromatographs according to claim 6, wherein the pipe is made of metal, the first component is welded to said one of the sampling needle and the pipe, the second component is welded to said other of the sampling needle and the pipe.

10. The auto-sampler for chromatographs according to claim 6, wherein the packing is made of resin.

* * * * *